United States Patent [19]

Bahr et al.

[11] 4,369,271

[45] Jan. 18, 1983

[54] LACQUER FOR RECORD CARRIERS, AND PROCESS FOR ITS PRODUCTION

[75] Inventors: Dietrich J. Bahr, Herrenberg; Marian Briska, Boeblingen, both of Fed. Rep. of Germany

[73] Assignee: International Business Machines Corporation, Armonk, N.Y.

[21] Appl. No.: 244,362

[22] Filed: Mar. 16, 1981

[30] Foreign Application Priority Data

May 22, 1980 [DE] Fed. Rep. of Germany ....... 3019574

[51] Int. Cl.³ .............................................. C08L 1/14
[52] U.S. Cl. ..................................................... 524/40
[58] Field of Search ..................... 260/17 R, 17.4 UC; 524/40

[56] References Cited

U.S. PATENT DOCUMENTS

| | | | |
|---|---|---|---|
| 2,111,446 | 3/1938 | Gloor | 134/79 |
| 2,186,454 | 1/1940 | Gloor | 91/68 |
| 3,454,349 | 7/1969 | Smart | 8/4 |

*Primary Examiner*—Joseph L. Schofer
*Assistant Examiner*—Bernard Lipman
*Attorney, Agent, or Firm*—Joseph G. Walsh

[57] ABSTRACT

A process for producing a mechanically stable, heat resistant lacquer for record carriers on a cellulose monobutyrate basis, whereby the cellulose aceto monobutyrate and a polyvinyl ester copolymer with long aliphatic side chains are mixed with each other and are processed in the form of a lacquer after addition of the fillers and/or pigments.

8 Claims, No Drawings

LACQUER FOR RECORD CARRIERS, AND PROCESS FOR ITS PRODUCTION

TECHNICAL FIELD

The invention concerns a process for producing a mechanically stable, heat resistant lacquer with fillers and/or pigments for record carriers based on cellulose aceto monobutyrate, and with the lacquers so produced.

PRIOR ART

Such cellulose acetate monobutyrate based lacquers for record carriers, comprising a substrate, such as paper, a lacquer layer, and a metallic top layer of aluminum or containing aluminum, have several very positive properties when they are used for coating record carriers at a medium to high molecular weight. They belong to the heat resistant celluloses and their melting and decomposition temperatures practically coincide, so that the lacquer is still elastic in the required temperature range, retaining the pigments, i.e., there is no chalking. In addition, such lacquers have a low oil absorption, i.e., they can be dulled by adding a relatively small quantity of filler solid matter. Such lacquers are also relatively hard, and thus, almost comparable to nitrocellulose, so that they are not mechanically attacked by electrodes sliding across their surface. Furthermore, such lacquers have a low solvent retention, which is technically and economically important. At too high a solvent retention the polymers are unsuitable because of their unduly long drying periods. Unfortunately, however, cellulose monobutyrate has several serious disadvantages making it unsuitable for the proposed application. At the high molecular weights required for its heat resistance, cellulose monobutyrate has a relatively high polarity, i.e., its carbon black compatibility is very poor, depriving a lacquer film of its internal stability. When a sufficient quantity of carbon black is added, the cohesion of the lacquer is greatly reduced, so that the lacquer becomes brittle. In addition, the lacquer shrinks considerably during drying, reducing its adhesion to paper. The extraordinarily low solvent retention causes the lacquer to be dried in the press to such an extent that it scarcely penetrates the paper, thus poorly adhering to the latter.

In principle, plasticizers are added to all lacquers used to produce record carriers, in order to reduce shrinkage during curing, to reduce the polarity and to improve the general processability. However, plasticizers based on a physical effect lead to an unfortunate lowering of the melting point.

DISCLOSURE OF THE INVENTION

Therefore, it is the object of the invention to provide an approach permitting the above-mentioned good properties of cellulose aceto monobutyrate based lacquers to be retained, without having to tolerate the bad properties also mentioned. For this purpose, experiments have been conducted to determine whether it is possible chemically to change the polarity of cellulose monobutyrates, i.e., to effect chemical softening without eliminating their physical properties, such as heat resistance or mechanical stability. In accordance with the present invention, this problem is solved by mixing cellulose aceto monobutyrate with a polyvinyl ester copolymer with long aliphatic side chains, the two starting materials being individually dissolved in a solvent, at a ratio of 65 percent to 90 percent by weight of cellulose aceto monobutyrate to 10 to 35 percent by weight of copolymer, and by processing said materials in the form of a lacquer after the fillers and/or pigments have been added. For this purpose, a polyvinyl ester copolymer is used, the side chains of which consists of long aliphatic chains with a minimum length of 8 carbons atoms, whereby said side chains of the copolymer are esterified at the main chain at a spacing of more than 6 carbon atoms. It is particularly advantageous for the copolymer to consist of vinyl acetate copolymerized with vinyl lauryl ester at about 20 percent by weight.

BEST MODE OF CARRYING OUT THE INVENTION

The two starting materials are set as a 12 percent solution in ethyl acetate with several percent butyl acetate, these solutions being mixed with each other and fillers and/or pigments being added to the solution thus obtained. To achieve optimum results, the mixture ratio should be 72 percent cellulose aceto monobutyrate to 28 percent PVA (polyvinyl acetate) copolymer at a molecular weight of the PVA (polyvinyl acetate) copolymer of about 100,000.

Subsequently, about 2 percent to about 4 percent carbon black and about 4 percent to 5 percent calcium carbonate are added to this solution mixture.

Even at that degree of filling and very high dullness, the lacquer thus produced has an excellent adhesion to paper, a high elasticity and a very good hardness. The original shrinkage of the monobutyrate has almost disappeared. In spite of the relatively low molecular weight of the polyvinyl acetate component of only about 90,000 and the high mixture proportion of almost 30 percent, the melting temperature is not reduced over that obtainable with a monobutyrate treated with conventional plasticizers.

This is presumably due to the fact that the long side chains of the polyvinyl ester exert a spatial blocking effect. In fact, physical softening already occurs if a high percentage of copolymer is added (say about 50 percent), and at temperatures of 180° C. to 200° C. the product becomes soft, i.e., it behaves like a true mixture because of the excess copolymer. If the percentage of copolymers added is below 20 percent, the adhesion of monobutyrate to paper is scarcely affected. In the case of the above-mentioned mixture ratio of 72 percent to 28 percent the carbon black absorption capacity is considerably increased, whereas the absorption capacity for polar pigments, such as calcium carbonate, is reduced. However, both absorption capacities are sufficient for the proposed application, so that the lacquers obtained have a higher overall dullness and the cohesion of the lacquer film is good. It is essential for this condition to be fulfilled, although that is a contradiction in itself with nearly all pure polymers. A high dullness can only be obtained by filling the lacquer up to capacity. For the internal cohesion of a lacquer filled up to capacity it is essential that there is an affinity between the filler polarity and the polymers. If the two components are mutually repulsive, the lacquer immediately loses its mechanical strength, i.e., it chalks.

It would be advantageous to use a PVA copolymer whose molecular weight is about 500,000 and thus comparable to that of monobutyrate.

In summary, it can be said that one of the most essential effects of this mixture of monobutyrate and copolymer is that it is suitable for polar as well as non-polar pigments and fillers. In accordance with the various tests conducted so far, this was not to be expected.

What is claimed is:

1. A process for producing a mechanically stable, heat resistant lacquer for record carriers, said process comprising the steps of:
   (1) forming a solution of cellulose aceto monobutyrate in a solvent;
   (2) forming a solution of a copolymer of vinyl acetate and vinyl lauryl ester in a solvent;
   (3) mixing together the two above solutions at a ratio of from 65 to 90% by weight cellulose aceto monobutyrate to 10–35% by weight copolymer; and
   (4) adding a filler or a pigment to the mixture.

2. A process as claimed in claim 1 comprising adding from 2 to 4% by weight of carbon black pigment.

3. A process as claimed in claim 1 comprising adding from 4 to 5% by weight of calcium carbonate filler.

4. A process as claimed in claim 1 wherein the solvent is ethyl acetate containing 7% butyl acetate.

5. A lacquer produced in accordance with the process of claim 1.

6. A lacquer produced in accordance with the process of claim 2.

7. A lacquer produced in accordance with the process of claim 3.

8. A lacquer produced in accordance with the process of claim 4.

* * * * *